United States Patent
Hansen (10) Patent No.: US 12,165,274 B1
(45) Date of Patent: Dec. 10, 2024

(54) DYNAMICALLY RENDERING A 3D MODEL OF AN OBJECT IN A DIGITAL ENVIRONMENT

(71) Applicant: Brand3D, Inc, Tampa, FL (US)

(72) Inventor: Hans Hesselholt Henne Hansen, Tampa, FL (US)

(73) Assignee: Brand3D, Inc, Tampa, FL (US)

( * ) Notice: Subject to any disclaimer, the term of this patent is extended or adjusted under 35 U.S.C. 154(b) by 0 days.

(21) Appl. No.: 18/441,360

(22) Filed: Feb. 14, 2024

(51) Int. Cl.
  *G06T 19/20* (2011.01)
  *G06T 19/00* (2011.01)

(52) U.S. Cl.
  CPC ............ *G06T 19/20* (2013.01); *G06T 19/006* (2013.01); *G06T 2219/2012* (2013.01); *G06T 2219/2016* (2013.01)

(58) Field of Classification Search
  None
  See application file for complete search history.

(56) References Cited

U.S. PATENT DOCUMENTS 10,181,218 B1 * 1/2019 Goetzinger, Jr. ..... G06F 3/0486

* cited by examiner

*Primary Examiner* — Robert J Craddock
(74) *Attorney, Agent, or Firm* — Shumaker, Loop & Kendrick, LLP (57) ABSTRACT

A system and method for dynamically modifying and rendering 3D models in digital environments, particularly in virtual reality (VR) or augmented reality (AR) settings. The system receives information about a 3D model, information regarding the digital environment, and placement information for aligning the 3D model within the digital environment. A configuration interface is generated based on a catalogue of variants, allowing users to modify the 3D model's textures and colors. Modifications are received via the configuration interface, and the 3D model is updated and stored as an instance. The instance, saved as a pluggable piece of code, can be uploaded in real-time to render the modified 3D model in the digital environment.

14 Claims, 6 Drawing Sheets

OUR MATERIALS

Solid Surface

Using our premium Luxecast composite material, containing minerals derived from natural stone, we have created more sophisticated and imaginative designs in bathtubs and sinks than ever before.

Rosalia Bathtub and Sink

Acrylic

Strong and durable, acrylic Jacuzzi bathtubs are reinforced with a proprietary fiberglass/resin formula that ensures a Long-lasting quality surface.

Luna Bathtub

DYNAMICALLY RENDERING A 3D MODEL OF AN OBJECT IN A DIGITAL ENVIRONMENT

PRIORITY INFORMATION

The present application does not claim a priority from any other application.

TECHNICAL FIELD

The present subject matter described herein, in general, relates to dynamically rendering a three dimensional (3D) model of an object in a digital environment.

BACKGROUND

The incorporation of three-dimensional (3D) models into virtual and augmented reality (AR) environments has gained popularity in recent years. Due to the confluence of technologies, consumers can now interact with digital components in multiple ways, creating new opportunities for immersive and interactive experiences.

Existing systems frequently display 3D models in a static manner within virtual settings; this lacks the adaptability and personalization that consumers want. The existing systems fail to allow users to dynamically alter and customize the 3D models in real time. Moreover, users who are not proficient in digital design or 3D modeling may find that the present systems lack user-friendly interfaces.

Moreover, there are difficulties in storing and distributing personalized 3D models throughout various virtual settings, and the existing systems do not have a portable and simplified solution.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only and is not intended to limit the scope of the present application. This summary is provided to introduce concepts related to systems and methods for dynamically rendering a three dimensional (3D) model of an object in a digital environment and the concepts are further described below in the detailed description. This summary is not intended to identify essential features of the claimed subject matter nor is it intended for use in determining or limiting the scope of the claimed subject matter.

In one implementation, a system for dynamically rendering a three dimensional (3D) model of an object in a digital environment is disclosed. The system may comprise a processor and a memory coupled to the processor. The processor may be configured to execute program instructions stored in the memory. The system may construct a digital environment based on a construction layout. The construction layout may comprise at least one of measurements of one or more lots in the digital environment, boundaries, and navigational routes. The system may then receive 3D model data and model placement data. The placement data may correspond to a position and an orientation of the 3D model in the digital environment. The 3D model data may comprise at least one of a wireframe of the object and physical attributes of the object. Further, the system may render the 3D model of the object in the digital environment based on the 3D model data, the placement data and the construction layout. Furthermore, the system may generate a configuration interface based on catalogue data of the object. The catalogue data may comprise variants of the object. Subsequently, the system may link the configuration interface to the 3D model of the object. The configuration interface may be a set of options displayed to an entity in the digital environment when proximity of the entity to the 3D model is greater than a predefined threshold. The set of options may comprise a plurality of options for modifying the 3D model including at least one of a color option, a texture option, a pattern option, a variant option, and a size option. The system may interpret a modification of the 3D model based on an input received from the configuration interface. The system may render a modified 3D model based on the modification. Further, the system may store the modified 3D model as an instance. The instance may be pluggable in the digital environment.

In another implementation, a method for dynamically rendering a three dimensional (3D) model of an object in a digital environment is disclosed. In order to dynamically render a three dimensional (3D) model of an object in a digital environment, initially, a digital environment may be constructed based on a construction layout. The construction layout may comprise at least one of measurements of one or more lots in the digital environment, boundaries, and navigational routes. In an embodiment, the one or more lots may correspond to an area of a property having one or more bifurcations. The property may include a piece of a land, construction site, playground, retail space, and the like. Further, 3D model data and model placement data may be received. The placement data may correspond to a position and an orientation of the 3D model in the digital environment. The 3D model data may comprise at least one of a wireframe of the object and physical attributes of the object. Furthermore, the 3D model of the object may be rendered in the digital environment based on the 3D model data, the placement data and the construction layout. Subsequently, a configuration interface may be generated based on catalogue data of the object. The catalogue data may comprise variants of the object. The configuration interface may be linked to the 3D model of the object. The configuration interface may be a set of options displayed to an entity in the digital environment when proximity of the entity to the 3D model is greater than a predefined threshold. The set of options may comprise a plurality of options for modifying the 3D model including at least one of a color option, a texture option, a pattern option, a variant option and a size option. A modification of the 3D model may be interpreted based on an input received from a user through the configuration interface. A modified 3D model may be rendered based on the modification. Further, the modified 3D model may be stored as an instance. The instance may be pluggable in the digital environment.

In yet another implementation, non-transitory computer readable medium embodying a program executable in a computing device for dynamically rendering a three dimensional (3D) model of an object in a digital environment is disclosed. The program may comprise a program code for constructing a digital environment based on a construction layout. The construction layout may comprise at least one of measurements of one or more lots in the digital environment, boundaries, and navigational routes. The program may comprise a program code for receiving 3D model data and model placement data. The placement data may correspond to a position and an orientation of the 3D model in the digital environment. The 3D model data may comprise at least one of a wireframe of the object and physical attributes of the object. The program may comprise a program code for rendering the 3D model of the object in the digital environment based on the 3D model data, the placement data and the construction layout. The program may comprise a program code for generating a configuration interface based on catalogue data of the object. The catalogue data may comprise variants of the object. The program may comprise a program code for linking the configuration interface to the 3D model of the object. The program may comprise a program code for interpreting a modification of the 3D model based on an input received from the configuration interface. The program may comprise a program code for rendering a modified 3D model based on the modification. The program may comprise a program code for storing the modified 3D model as an instance. The instance may be pluggable in the digital environment.

BRIEF DESCRIPTION OF THE DRAWINGS

The foregoing detailed description of embodiments is better understood when read in conjunction with the appended drawings. For the purpose of illustrating the disclosure, examples of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer to like features and components.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "constructing," "receiving," "rendering," "generating," "linking," "interpreting," "storing," "having," "comprising," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

As there were various challenges observed in the existing art, these challenges necessitated a need for dynamically rendering a 3D model of an object in a digital environment. A technical problem faced in systems dealing with 3D modelling is that 3D models require large amounts of memory and processing power to be loaded and configured. The solution presented in the embodiments disclosed herein to address the above problem is a system for prerendering one or more 3d models for different variants of an object and storing the different rendered 3D models as an instance of the original 3D model. The instance of the original 3D model may then be used to save memory and processing power allowing modification of the 3D models in real time.

While aspects of the described system and method for dynamically rendering a 3D model of an object in a digital environment may be implemented in any number of different computing systems, environments, and/or configurations, the embodiments are described in the context of the following exemplary system.

Figure 1:
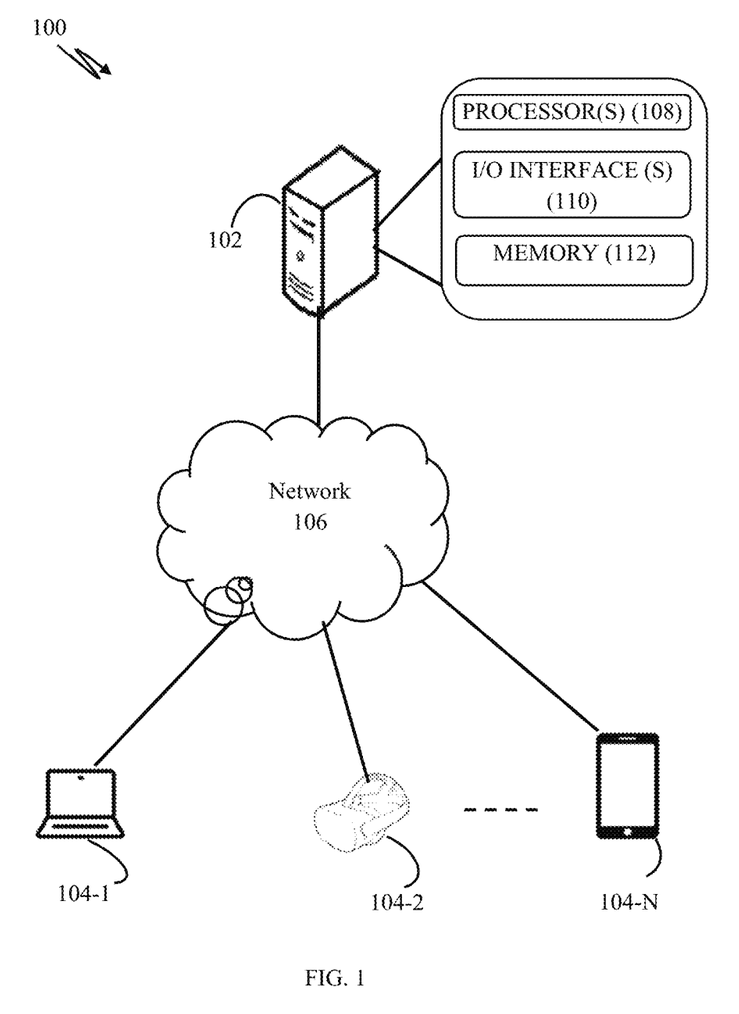
FIG. 1 illustrates a network implementation of a system for dynamically rendering a 3D model of an object in a digital environment, in accordance with an embodiment of the present subject matter.

Referring now to FIG. 1, a network implementation 100 of a system 102 for dynamically rendering a 3D model of an object in a digital environment is disclosed. It may be noted that one or more users may access the system 102 through one or more user devices 104-2, 104-3 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It is understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include but are not limited to, a portable computer, a personal digital assistant, a handheld device, and a workstation. The user devices 104 are communicatively coupled to the system 102 through a network 106. In another implementation, the system 102 may be implemented on a user device 104 as a stand-alone system.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, a memory 112, and a database 114. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, for dynamically rendering a 3D model of an object in a digital environment, a user may use the user device 104 to access the system 102 via the I/O interface 110. The user may register the user devices 104 using the I/O interface 110 in order to use the system 102. In one aspect, the user may access the I/O interface 110 of the system 102 to provide input to the system if required.

The present subject matter describes the system 102 for dynamically rendering a 3D model of an object in a digital environment. The system 102 may construct a digital environment based on a construction layout. The digital environment may correspond to a computer-generated, immersive space that users can interact with, typically facilitated through technologies such as virtual reality (VR), Mixed Reality, and augmented reality (AR). In VR, users are fully immersed in a computer-generated environment, experiencing a simulated reality. In AR, digital elements are overlaid onto the real-world environment, enhancing the user's perception and interaction with the surroundings. The construction layout may comprise at least one of measurements of one or more lots in the digital environment, boundaries, and navigational routes. In an embodiment, the one or more lots may correspond to an area of a property defined by a bifurcation. The property may include a piece of a land, construction site, playground, retail space, and the like. In an embodiment, the construction layout may be received from a user in the form of images or drawings. In another embodiment, the construction layout may be generated based on image data captured by a user in real time using a camera device. In an embodiment, one or more images may be derived from a video of a physical environment to generate the image data. The system may employ image processing algorithms to extract spatial information of surroundings captured in the video. The image processing algorithms may detect physical features and determine dimensions of the physical features in image frames of the video. In an embodiment, the image data may include color images, depth images, and video.

Consider an example of an augmented reality (AR) digital environment. The system may receive a video of the physical environment over which objects need to be projected in the AR digital environment. The objects may appear to be overlaid on the physical environment. The system detects one or more physical structures in the digital environment by analyzing the video. Further, the system determines measurements using 3D modelling techniques including Simultaneous Localization and Mapping (SLAM), photogrammetry, motion tracking, and object detection.

In an embodiment, the digital environment is constructed based on at least one of drawings and images. The system may perform spatial mapping by analyzing at least one of the drawings and the images. Further, the system may employ 3D reconstruction techniques to render the VR environment based on at least one of the drawings, the images, and the spatial mapping.

Further to obtaining the construction layout, the system may construct the digital environment based on the construction layout. In an embodiment, the system may receive a set of interaction features for the digital environment. Interaction features in augmented reality (AR) and virtual reality (VR) refer to the mechanisms and tools that enable users to engage with and manipulate the digital content within the immersive environment. These features enhance user experience, allowing for dynamic and interactive engagement with the virtual or augmented elements. The interaction features may include at least one of gesture recognition, controller input, touch and tap interactions, voice commands, eye tracking, spatial computing, and the like. In an embodiment, the interaction features may comprise interactions in the physical environment and interactions in the digital environment. The interactions in the physical environment may be detected using one or more sensors connected to a human body. The one or more sensors may include Electroencephalogram (EEG) sensor, temperature sensors, heart rate sensors, oxygen sensors, and other sensors that may detect biological changes. The biological changes detected from data received from the one or more sensors may indicate an action to be performed in the digital environment. Further, the interactions in the digital environment may include movement of an avatar from a position to another position, a text input, a voice input, and the like.

Subsequent to construction of the digital environment, the system may receive 3D model data and model placement data. The model placement data corresponds to a position and an orientation of the 3D model in the digital environment. The position may refer to location of the 3D model in the coordinate system of the digital environment. In a typical Cartesian coordinate system, which consists of three axes (X, Y, and Z), the position of the 3D model is specified by a set of three coordinates (x, y, z). These coordinates represent the distance of a reference point of the 3D model from the origin of the coordinate system. The orientation of the 3D model describes rotational alignment of the 3D model within the digital environment. In a three-dimensional environment, rotation can occur around each of the three axes (X, Y, and Z). The orientation is often represented using angles or rotation matrices that define the model's tilt, pitch, and roll. The 3D model data comprises at least one of a wireframe of an object and physical attributes of the object. In an embodiment, the 3D model data may comprise at least one of the following.

Geometry Data—The geometry data corresponding to a 3D model may comprise at least one of one or more vertex positions, one or more vertex normal, and vertex indices. The one or more vertex positions refer to coordinates, in the digital environment, of one or more vertices of the 3D model. The vertices may be one or more points on edges and corners of the 3D model that may define the shape of the 3D model. The one or more vertex normal may provide orientation of the one or more vertices indicating a direction where the one or more vertices may be facing. The vertex indices may be used to define topology of the one or more vertices.

Material and Texture Data: The material and texture data corresponding to a 3D model may comprise at least one of material properties comprising color, reflectivity, transparency, and the like, texture coordinates comprising ultraviolet coordinates to map a texture onto a 3D model.

Transformation data: The transformation data may include translations, rotations, and scales applied to the 3D model.

Lighting and Camera Information: The lighting and camera information may comprise at least one of one or more lighting sources, camera properties defining perspective or orthographic projection, field of view, and camera position.

File Format and Compression Information: The file format and compression information may comprise at least one of a File Format Specifications including details about how the data is encoded and stored in a file, compression information including techniques of compression used for compression.

The object may be a product being displayed in the digital environment. The position of the object may correspond to three dimensional coordinates of the object in the digital environment. In an embodiment, the position may be defined by a set of coordinates. For example, the position of a 3D model of a car may be defined by the three dimensional coordinates of four wheels of the car in the digital environment. In an embodiment, the position of the car may be defined by coordinates of the centroid of the car in the digital environment. Similarly, the orientation may be defined by an angle with respect to an axis of the digital environment. For example, the orientation of the car may be defined as parallel to the X axis.

In an embodiment, the 3D model data and the model placement data may be received by first identifying the object using a unique identifier (UID). The UID may be recognized based on data transmitters including a Radio Frequency Identification (RFID) tag, a Near Field Communication (NFC) tag, and the like. The UID may also be determined based on a code including a Quick Response (QR) code, a Bar code, and the like. In an embodiment, the data transmitters may be installed on a miniature physical 3D model of the object placed in the physical environment. In an embodiment, the code may be printed on the miniature 3D model such that it can be scanned using a camera device. The code may contain indication to a specific variant of the 3D model.

In an embodiment, the system may render the 3D model for an entity based on an identifier of the entity. For example, a QR code may be scanned by entity A to render a 3D model of a jacuzzi tub in blue color, further, when the QR code is scanned by entity B, the system may render a 3D model of the jacuzzi tub in white color. The entity may resemble a user accessing the digital environment as a digital avatar. The user may be a human user, an Artificial Intelligence Bot, and the like.

In an embodiment, the system may receive a list of objects and corresponding UIDs for a digital environment and the system may fetch, from the database, the 3D model data and model placement data for the objects from the list of objects.

The system may plot a 3D model of the object in the digital environment based on the 3D model data and the model placement data. The 3D model may be aligned with at least one physical feature in the digital environment. To accurately render the 3D model in the digital environment, the system may initially calibrate pose of the user device. The user device may be at least one of a smartphone, a Television (TV), an AR headset, a VR headset, and the like. The pose may include position and orientation of the user device. In case of portable and wearable user devices such as smartphones, AR and VR headsets, the position and the orientation of the user device may be determined based on sensor data received from the user device. The sensor data may include inertial data and visual data captured using a combination of sensors, such as accelerometers, gyroscopes, magnetometers, and cameras, to track the user's movement and orientation in the digital environment. The visual data may include images of the surrounding that may be used to reconstruct the physical environment around a user. In case of immobile user devices such as TVs, the pose may be determined based on commands received via a remote control.

Further, the system may establish a global coordinate system. The global coordinate system may be used as a reference for determining position of the object in the digital environment. To establish the global coordinate system, the system may first define a point in the physical space as a global origin to be a starting point. Further, the system may set axes directions based on a standardized convention such as the right hand rule.

Further, the system may determine a scale for the coordinate system comprising a unit of measurement for the axes. The scale may be used to compare and determine measurements of the object in the digital environment with respect to the physical world. The system may use one or more algorithms to align the object in the digital environment based on the coordinate system and scale. The one or more algorithms may include Ray Tracing, Rasterization, Marching Cubes, Iterative Closest Point, and the like.

The system may then generate a configuration interface. The configuration interface is a set of options displayed to an entity in the digital environment when proximity of the entity to the 3D model is greater than a predefined threshold. The entity may be an avatar of a user viewing the digital environment. The user may be a human, a programmed bot, or an AI bot. The configuration interface is generated based on catalogue data. The catalogue data may include variations of the object that need to be showcased. The catalogue data may comprise one or more color variations, size variations, and texture variations. In an embodiment, the catalogue data may be received from a database comprising a list of objects and catalogue data corresponding to objects from the list of objects. The configuration interface may include the set of options for a user to choose from in order to modify the 3D model. The set of options comprises a plurality of options for modifying the 3D model including at least one of a color option, a texture option, a pattern option, a variant option and a size option.

Consider an example of a digital environment constructed in a car showroom. The digital environment is a projection over the physical car showroom. The projection comprises projections of cars that may be rendered when a user in the car showroom scans a QR code placed at a position in the physical car showroom. The position of the QR code may be defined by a set of coordinates in the physical car showroom. The 3D model of the car is rendered by scanning the QR code. The 3D model is projected in the digital environment. The digital environment may be overlaid on the physical car showroom. Further, the 3D model of the car is rendered at the position of the QR code in the physical car showroom. The position of the 3D model of the car in the digital environment may be determined by transforming the position of the QR code in the physical car showroom into a corresponding position in the digital environment using the coordinate system and scale determined by the system. The coordinate system may be used to align an origin of the physical showroom with an origin of the digital environment to calculate the position of the 3D model of the car based on distance of the position of the QR code in the physical car showroom from the origin of the physical car showroom. Further, when the entity moves closer to the 3D model, the entity may be presented with the configuration interface comprising options to customize the 3D model of the car. The configuration interface may display a set of color options for the car, one or more accessories for the car, and the like. The configuration interface is generated based on catalogue data provided by the car showroom. In an embodiment, the configuration interface may be generated using a machine learning algorithm. The machine learning algorithm may be used to detect variants corresponding to the object by processing the catalogue data.

Figure 6A:
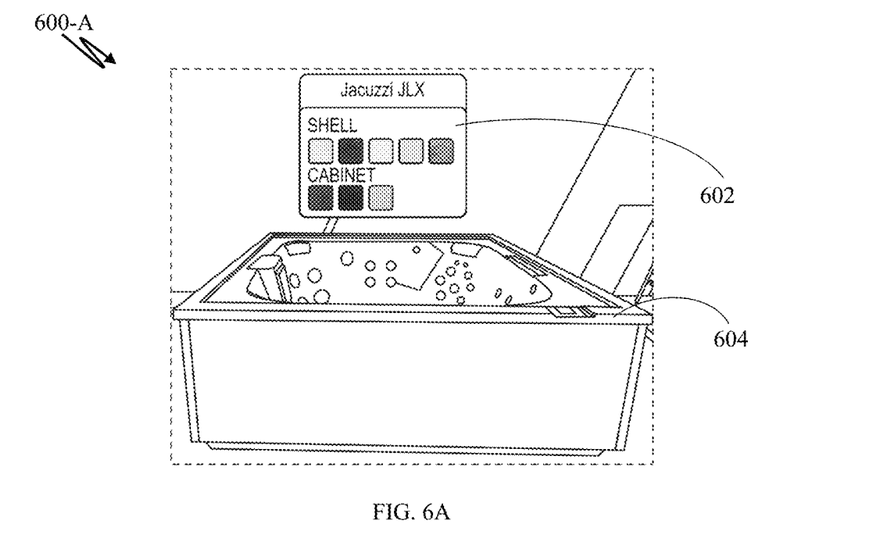
FIGS. 6A and 6B illustrate a view of the digital environment through user devices, in accordance with an embodiment of the present subject matter.

Consider another example, illustrated in FIG. 6A, a 3D model of a jacuzzi 604 is rendered in a digital environment. Further, the configuration interface 602 corresponding to the jacuzzi is displayed above the 3D model of the jacuzzi 604. The configuration interface 602 comprises options related to colors of components of the jacuzzi.

Further, the configuration interface may be linked to the 3D model in a way that an option selected on the configuration interface by the user may be registered as a modification for the 3D model requested by the user. The system may then interpret the option, on the configuration interface, selected by the user as a modification for the 3D model. The option selected by the user is received by the system through a communication system. The communication mechanism generates a command to record a user ID, a modification ID, and a 3D model ID upon selection of an option on the configuration interface. The user id may correspond to a unique identifier assigned to a user accessing the digital environment. The modification id may correspond to the option selected by the user. The 3D model id may correspond to the 3D model in the digital environment being modified by the user.

In an embodiment, the 3D models in the digital environment may return to original configurations after a user signs out of the digital environment. In another embodiment, the system may say the modification for a user such that when the user signs in to the digital environment after signing out, the modified 3D model is displayed instead of the original 3D model.

Upon receiving the selection from the user, via the communication mechanism, the 3D model is modified to incorporate the option selected by the user. For example, if the user selects a color change, the 3D model is rendered with the selected color. The modified 3D model may be stored as an instance that may be saved as a code which embeds the modified 3D model in the digital environment. The modification may be linked to the user id such that only the 3D model is only modified for the user requesting the modification. The instance of the 3D model may be embedded on in the digital environment using an embed-code generated by the system based on the option selected by the user. The embed-code may comprise one or more parameters defining the modified 3D model and a web address corresponding to the 3D model.

In an embodiment, the embed-code may comprise a user id such that the modified 3D model for a user is pre-rendered when the user accesses the digital environment.

In an embodiment, the 3D model may be modified using the following steps. First, the system captures the modification as layers. Each layer corresponds to a specific aspect of the modification, such as color, texture, and the like. For example, if the user selects the option to change the color of the 3D model, the color is stored as a separate layer. The layering approach not only facilitates efficient storage but also enables easy future modifications without affecting the entire mode. Further, the system combines the selected options into a single image file. The image file serves as a snapshot of the entire modified 3D model, with each layer contributing to the overall appearance. The image file is assigned a unique link to access the image file and embed the modified 3D model corresponding to the image file. In an embodiment, the system may employ a machine learning algorithm to generate textures for the object. The machine learning algorithm may be trained using one or more 3D models of the object. The one or more 3D models of the object may be created using catalogue data, product specifications, and other documents related to the object. The machine learning model may generate the modified 3D model by incorporating features from the one or more 3D models of the object.

In an embodiment, the system may pre-render one or more modified 3D models of the object based on the set of options in the configuration interface. The system may select the pre-rendered modified 3D model based on the option selected by the user. The modified 3D model may be saved as an instance of the 3D model of the object that may be embedded in the digital environment using the embed-code. In an embodiment, the instance may be rendered in the digital environment using a 3D viewer that may access the instance based on the embed-code and application programming interfaces (APIs) corresponding to the 3D viewer.

Figure 2:
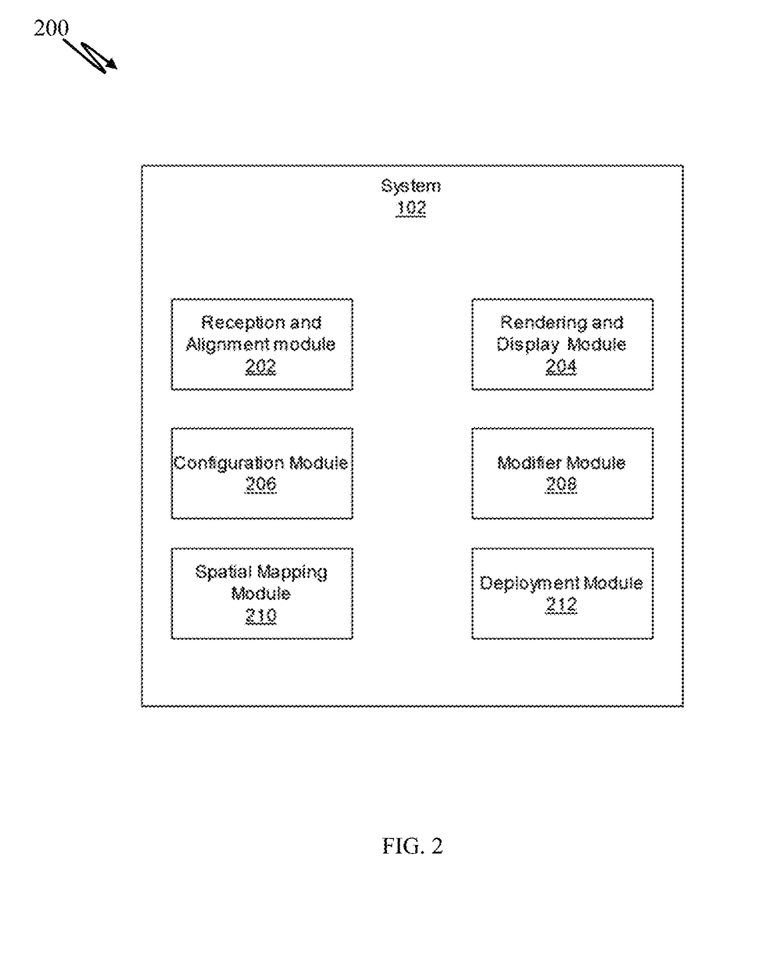
FIG. 2 illustrates a system architecture for dynamically rendering a 3D model of an object in a digital environment, in accordance with an embodiment of the present subject matter.

Referring now to FIG. 2, system architecture 200 for the above explained system is illustrated, in accordance with an embodiment of the present subject matter. The system 102 comprises an information reception and alignment (RA)

module 202. The RA module 202 may be used to receive the 3D model data and the model placement data from an animation engine. The RA module may process the 3D model data received from an animation engine. The animation engine may be a software used to create the 3D model. The RA module standardizes the 3D model data based on the animation engine used to create the 3D model and a standard code format. The RA module may employ a standardization algorithm that may be trained to process 3D model data received from a plurality of animation engines such as Unity®. The standardization algorithm may be trained using a training dataset comprising 3D model data corresponding to a plurality of 3D models created using one or more animation engines, standardized 3D model data for the plurality of 3D models. The standardization algorithm may be trained to convert the 3D model data into a standardized format such that the system is compatible with the plurality of animation engines. To standardize the 3D model data, the system may initially define the standard code format for the 3D model data. For instance, the standard code format used is "Filmbox". The standardization algorithm may analyze the 3D model data received from the animation engine in order to identify information such as geometry data, material data, and the like from the 3D model data. Further, the standardization algorithm may map information in the 3D model data to the standard code format using a conversion pipeline. The standardization algorithm may generate a standardized 3D model data in the Filmbox format. Subsequently, the RA module further establishes an initial position and orientation of the 3D model in the digital environment based on the information in the standardized 3D model data.

The system 102 further comprises a rendering and display (RD) module 204. The RD module 204 is used for rendering the 3D model in the digital environment based on the 3D model data and the model placement data received by the RA module. Further, the RD module configures the coordinate system based on the user device being used to interact with the digital environment. The coordinate system is used to accurately display the rendered 3D model in the digital environment through the user device. Further, the RD module tracks movement of the user and aligns the 3D model in the digital environment based on user's movement using tracking techniques including SLAM, and computer vision.

Further, the system 102 may comprise a Configuration module 206. The Configuration module is used to generate the configuration interface based on the catalogue data. In an embodiment, the configuration module employs one or more machine learning algorithms to parse the catalogue data and identify modification options for variants corresponding to an object. In an embodiment, the configuration module may use a machine learning algorithm to analyze the catalogue data. The machine learning algorithm may be trained to identify modification options based on text and images in the catalogue data. The machine learning algorithm may be trained using a training dataset comprising catalogue data for a plurality of objects and annotated customization options for the plurality of objects. Considering an example, that the object is a bath tub. The catalogue data corresponding to the bath tub comprises images of three variants of the bath tub. For instance one of the variants is white in color, the second variant is black in color, and the third variant is gray in color. The machine learning algorithm may process the three images and determine that the modification options for the bathroom are color: white, black, and gray.

In an embodiment, the configuration module may receive a list of options corresponding to an object. The configuration module may generate the configuration interface based on the list of options. In an embodiment, the configuration interface may be projected over the 3D model of the object in the digital environment. In an embodiment, the configuration interface may be rendered in the digital based on at least one of the position of the 3D model, the orientation of the 3D model, a predefined distance, and the size of the 3D model. The predefined distance may correspond to a gap between the 3D model and the configuration interface. In an embodiment, the system may render the configuration interface based on a position of the entity in the digital environment to align and scale the configuration interface based on an angle of viewing of the entity.

Furthermore, the system 102 may comprise a Modifier module 208. The modifier module is used for rendering the modified 3D model based on an option selected by the user on the configuration interface. The option selected by the user may be at least one of a color option, a size option, a texture option. The modifier module may use 3D reconstruction techniques to render the modified 3D model. For example, if the user selects a color option and chooses red color the Modifier module may render the modified 3D model in red color. In an embodiment, the modifier module may employ an Artificial Intelligence (AI) texture generator for the modified 3D model. The AI texture generator may generate a unique texture for the modified 3D model using which the modified 3D model is embedded to the digital environment. In an embodiment, the unique texture may be generated based on surroundings of the 3D model in the digital environment. The unique texture may incorporate reflections and lighting conditions in the digital environment. The AI texture generator may be trained using a plurality of 3D models placed in a plurality of positions within a plurality of digital environments, and modified 3D models with annotated modifications in the texture of 3D models. The annotated modifications may correspond to modifications made in order to merge the 3D model with the surroundings in the digital environment.

The system 102 may comprise a spatial mapping (SM) module 210. The SM module may be used to construct the digital environment. The SM module may use machine learning algorithms to analyze images of the physical environment to determine measurements of physical features that need to be projected in the digital environment.

The system 102 may comprise a Deployment module 212. The deployment module may be used to generate the code for the instance of the 3D model. The deployment module may analyze the Application Programming Integrations (APIs) of the digital environment. Further, the deployment module may manage the compatibility of the 3D model with the digital environment.

Figure 3:
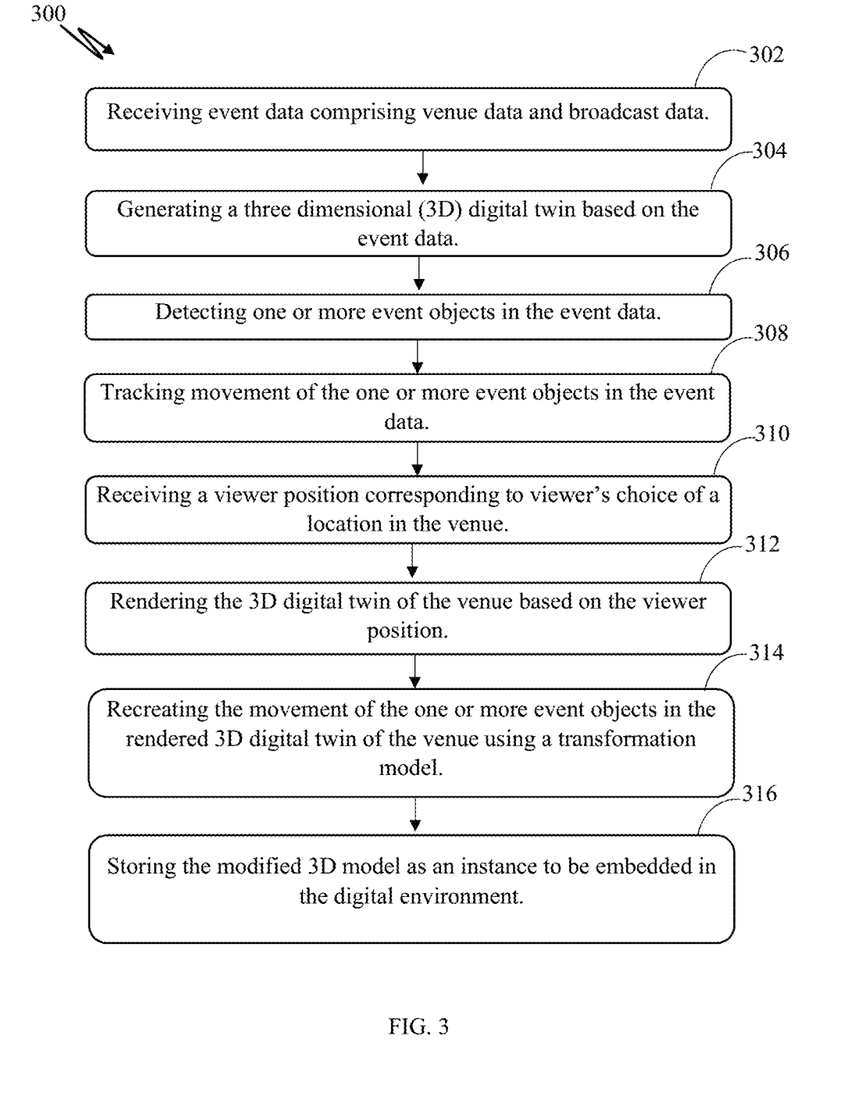
FIG. 3 illustrates a method for dynamically rendering a 3D model of an object in a digital environment, in accordance with an embodiment of the present subject matter.

Referring now to FIG. 3, a method 300 for dynamically rendering a 3D model of an object in a digital environment is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for dynamically rendering a 3D model of an object in a digital environment. Furthermore, the method 300 for dynamically rendering a 3D model of an object in a digital environment can be implemented in any suitable hardware, software, firmware, or combination thereof. However, for ease of explanation, in the embodiments described below, the method 300 may be considered to be implemented in the above-described system 102.

At 302, a digital environment is constructed based on a construction layout. The digital environment may be at least one of a virtual environment, a mixed reality environment, and an augmented reality environment. The augmented reality environment may comprise one or more objects projected on the physical environment. The digital environment may be accessed using at least one of a VR headset, an AR headset, a smartphone, and the like.

At 304, 3D model data and model placement data may be received.

At 306, the 3D model is rendered in the digital environment based on the 3D model data, the construction layout, and the model placement data.

At 308, a configuration interface may be generated based on catalogue data. The catalogue data may comprise variants of the object corresponding to the 3D model.

At 310, the configuration interface is linked to the 3D model of the object.

At 312, a modification of the 3D model is interpreted to modify the 3D model based on an option selected by a user from the configuration interface.

At 314, a modified 3D model is rendered based on the modification.

At 316, the modified 3D model is saved as an instance of the object. The instance may be a piece of code that may be embedded in the digital environment.

Figure 4:
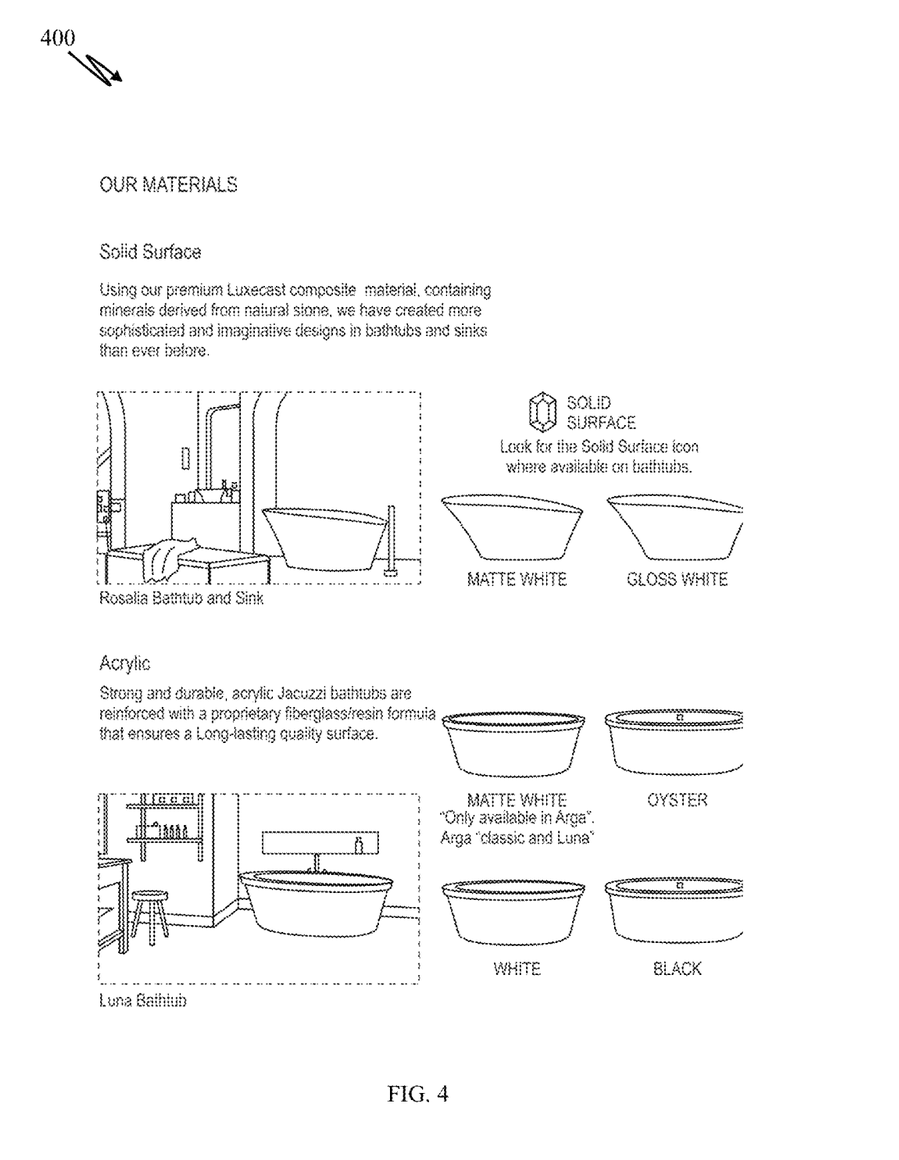
FIG. 4 illustrates an example of catalogue data, in accordance with an embodiment of the present subject matter.

Referring now to FIG. 4, an example 400 of catalogue data used to generate the configuration interface is illustrated. The catalogue data comprises an object, one or more options for modifications or variations in the object, one or more variants of the object, and text related to description of the object. In the example 400, the object is a jacuzzi tub and multiple color options for the jacuzzi tub are listed.

Figure 5A:
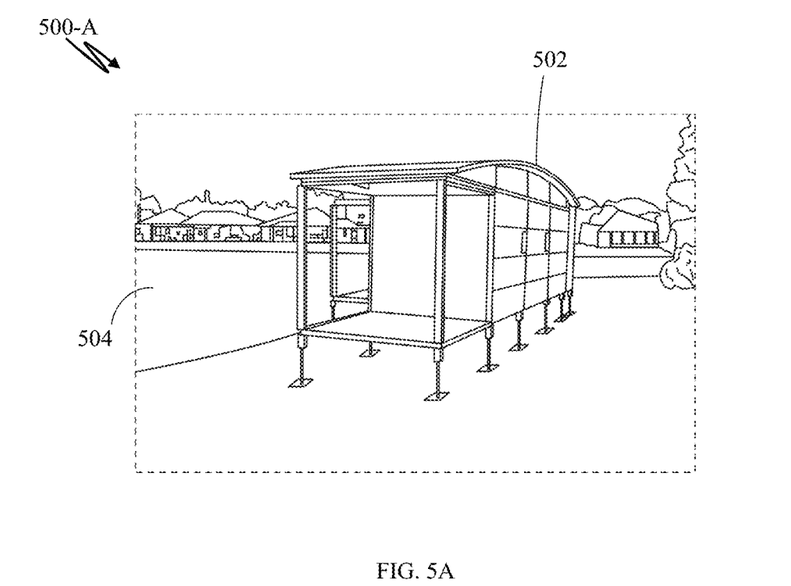
FIGS. 5A and 5B illustrate a digital environment comprising a rendered 3D model, in accordance with an embodiment of the present subject matter.

Referring now to FIG. 5A, a scene 500-A of a digital environment comprising a 3D model 502 is illustrated. The digital environment comprises an Augmented reality scene 504 comprising elements of the physical environment, over which the 3D model 502 is projected.

Figure 5B:
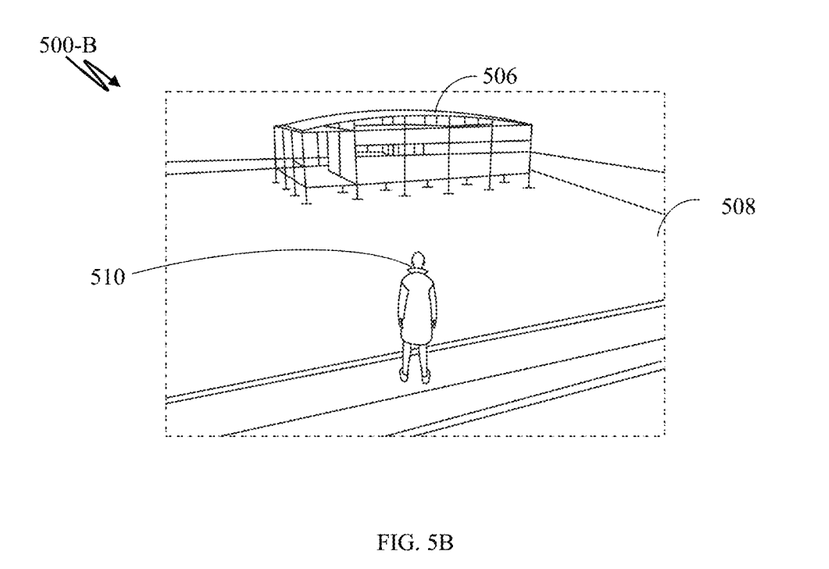

Referring now to FIG. 5B, an example 500-B of a digital environment is illustrated. The digital environment is generated based on a property plan 508 having annotations of various elements including a boundary, a navigation route, compass directions, and the like. Further, the digital environment comprises a 3D model 506 placed in the digital environment at a position, in a plot as shown in the FIG. 5B, based on the 3D placement data. Furthermore, the 3D model is being viewed by an avatar 510 of a user in the digital environment. The FIG. 5B illustrates a third-person view of the user in the digital environment.

Referring now to FIG. 6A, an example view 600-A of a 3D model 604 of a jacuzzi tub as seen on a smartphone, a computer, or any other device having a flat screen display is illustrated. FIG. 6A also illustrates the view of the configuration interface 602 corresponding to the 3D model. The configuration menu is positioned over the 3D model at a predefined distance from an edge of the 3D model.

Figure 6B:
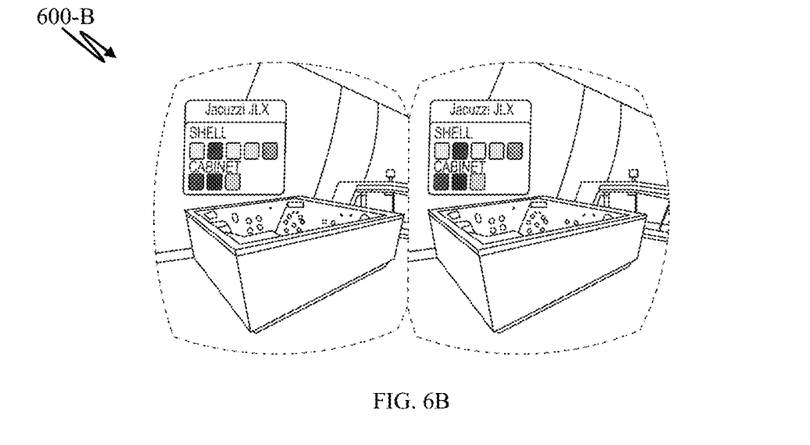

Referring now to FIG. 6B, an example view 600-B of a digital environment comprising a 3D model as seen using an AR headset or a VR headset is illustrated.

The embodiments of the system and the method described above may be used to showcase one or more products in a digital environment corresponding to a showroom space. In another embodiment, the system and the method described above may be used to generate a digital environment that may be a replica of a physical site. The system may further be used to render a 3D model of one or more objects and project the rendered 3D model over in the digital environment such that the 3D model is scaled to match dimensions of other features present in the physical site.

Exemplary embodiments discussed above may provide certain advantages. Though not required to practice aspects of the disclosure, these advantages may include the following.

Some embodiments of the system and the method may provide a better interactive experience for a user.

Some embodiments of the system and the method may provide smooth customization of a 3D model in a digital environment in real time.

Some embodiments of the system and the method may save time and resources for showcasing items without having to transport physical objects and arrange the physical objects. The users may still be able to experience and view the physical objects in the physical environment.

Although implementations for methods and system for dynamically rendering a 3D model of an object in a digital environment have been described in language specific to structural features and/or methods, it is to be understood that the appended claims are not necessarily limited to the specific features or methods described. Rather, the specific features and methods are disclosed as examples of implementations for dynamically rendering a 3D model of an object in a digital environment.

The invention claimed is:

1. A method for dynamically rendering a 3D model of an object in a digital environment, the method comprising:
   constructing a digital environment based on a construction layout, wherein the construction layout is generated using 3D modeling techniques based on image data, the image data comprising at least one of color images, video, and depth images;
   receiving 3D model data and model placement data, wherein the 3D model data comprises at least one of a wireframe of the object and physical attributes of the object;
   rendering the 3D model of the object in the digital environment based on the 3D model data, the placement data and the construction layout;
   generating a configuration interface based on catalogue data of the object, wherein the catalogue data comprises one or more variants of the object;
   linking the configuration interface to the 3D model of the object;
   interpreting a modification of the 3D model based on an input received from the configuration interface;
   rendering a modified 3D model based on the modification; and
   storing the modified 3D model as an instance, wherein the instance is embedded in the digital environment.

2. The method as claimed in claim 1, wherein the construction layout comprises at least one of a measurement of one or more lots in the digital environment, a boundary, and a navigational route, and wherein the one or more lots correspond to an area of a property represented in the digital environment.

3. The method as claimed in claim 2, wherein the navigational route corresponds to a predetermined path for movement in the digital environment.

4. The method as claimed in claim 1, wherein the placement data corresponds to a position and an orientation of the 3D model in the digital environment, and wherein the object the position and orientation are determined relative to a global coordinate system established by the system.

5. The method as claimed in claim 1, wherein the configuration interface includes a set of options displayed to an entity in the digital environment when proximity of the entity to the 3D model is greater than a predefined threshold.

6. The method as claimed in claim 4, wherein the set of options comprises one or more options for modifying the 3D model including at least one of a color, a texture, a pattern, and a size.

7. The method as claimed in claim 4, wherein the entity provides the input by selecting the one or more options on the configuration interface.

8. The method as claimed in claim 1, wherein the instance comprises one or more lines of code, and wherein the one or more lines of code connect a host application to the instance of the 3D model, and wherein the host application includes a webpage and a web based software.

9. The method as claimed in claim 1, wherein the object corresponds to a product showcased in the digital environment.

10. The method as claimed in claim 1, wherein the 3D model data and the model placement data is retrieved from a database comprising the 3D model data and the model placement data corresponding to one or more objects.

11. The method as claimed in claim 1, wherein the digital environment includes at least one of a virtual reality environment, a mixed reality environment and an augmented reality environment.

12. The method as claimed in claim 1, the modification is received as an input by a communication mechanism, wherein the communication mechanism records a user identification (ID), a modification ID, and a 3D model ID.

13. A system for dynamically rendering a 3D model of an object in a digital environment, the system comprises:
   a memory; and
   a processor coupled to the memory, wherein the processor is configured to execute program instructions stored in the memory for:
      constructing a digital environment based on a construction layout, wherein the construction layout is generated using 3D modeling techniques based on image data, the image data comprising at least one of color images, video, and depth images;
      receiving 3D model data and model placement data, wherein the 3D model data comprises at least one of a wireframe of the object and physical attributes of the object;
      rendering the 3D model of the object in the digital environment based on the 3D model data, the placement data and the construction layout;
      generating a configuration interface based on catalogue data of the object, wherein the catalogue data comprises one or more variants of the object;
      linking the configuration interface to the 3D model of the object;
      interpreting a modification of the 3D model based on an input received from the configuration interface;
      rendering a modified 3D model based on the modification; and
      storing the modified 3D model as an instance, wherein the instance is embedded in the digital environment.

14. A non-transitory computer readable medium having embodied thereon a computer program for dynamically rendering a 3D model of an object in a digital environment, the non-transitory computer readable medium storing instructions for:
   constructing a digital environment based on a construction layout, wherein the construction layout is generated using 3D modeling techniques based on image data, the image data comprising at least one of color images, video, and depth images;
   receiving 3D model data and model placement data, wherein the 3D model data comprises at least one of a wireframe of the object and physical attributes of the object;
   rendering the 3D model of the object in the digital environment based on the 3D model data, the placement data and the construction layout;
   generating a configuration interface based on catalogue data of the object, wherein the catalogue data comprises one or more variants of the object;
   linking the configuration interface to the 3D model of the object;
   interpreting a modification of the 3D model based on an input received from the configuration interface;
   rendering a modified 3D model based on the modification; and
   storing the modified 3D model as an instance, wherein the instance is embedded in the digital environment.

* * * * *